United States Patent
Tilli et al.

(10) Patent No.: US 11,548,465 B2
(45) Date of Patent: Jan. 10, 2023

(54) ONE WAY HINGE BRACKET FOR OPEN FRAME VEHICLE SIDE OCCUPANT RESTRAINT SYSTEM

(71) Applicant: FORD GLOBAL TECHNOLOGIES, LLC, Dearborn, MI (US)

(72) Inventors: Christopher Robert Tilli, Brighton, MI (US); Pamela Avendano arenas, Ypsilanti, MI (US); Jay Douglas Blackson, Dryden, MI (US); Erik B. Robins, White Lake, MI (US); Maria Fernanda Medina Luna, Naucalpan (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/177,385

(22) Filed: Feb. 17, 2021

(65) Prior Publication Data

US 2022/0258691 A1 Aug. 18, 2022

(51) Int. Cl.
*B60R 21/215* (2011.01)
*B60R 21/213* (2011.01)
*B60R 21/232* (2011.01)

(52) U.S. Cl.
CPC .......... *B60R 21/215* (2013.01); *B60R 21/213* (2013.01); *B60R 21/232* (2013.01); *B60R 2021/21537* (2013.01)

(58) Field of Classification Search
CPC .. B60R 2021/0072; B60R 2021/21512; B60R 2021/21537; B60R 21/213; B60R 21/215;
(Continued)

(56) References Cited

U.S. PATENT DOCUMENTS

| 5,437,470 | A | * | 8/1995 | Terai | ................... | B60R 21/2165 |
| | | | | | | 280/732 |
| 6,103,984 | A | * | 8/2000 | Bowers | ................. | B60R 21/213 |
| | | | | | | 280/730.2 |

(Continued)

FOREIGN PATENT DOCUMENTS

| DE | 10105716 | 9/2001 |
| DE | 102014013582 | 4/2015 |

(Continued)

*Primary Examiner* — Laura Freedman
(74) *Attorney, Agent, or Firm* — Vichit Chea; Price Heneveld LLP (57) ABSTRACT

A roof rail assembly for a motor vehicle having an open frame vehicle architecture includes a side air curtain fixedly coupled with a sport tube extending along a longitudinal axis of the motor vehicle. A one way hinge bracket overlaying the side air curtain includes an upper bracket portion coupled to the sport tube via a fastener extending through an orifice in the upper bracket portion, a lower bracket portion depending from a lower edge of the upper bracket portion, and a plurality of aligned openings disposed on the upper bracket portion below the orifice in the upper bracket portion and above the lower edge of the upper bracket portion. The lower bracket portion rotates about a bend line defined by the plurality of aligned openings as the side air curtain deploys from a stowed condition to an inflated condition.

13 Claims, 7 Drawing Sheets

(58) Field of Classification Search
CPC .... B60R 21/232; B60J 7/08; B60J 7/16; B60J 7/1628; B60J 7/1635; B60J 7/1642; B60J 7/165
See application file for complete search history.

(56) References Cited

U.S. PATENT DOCUMENTS

| | | | |
|---|---|---|---|
| 6,179,324 B1 * | 1/2001 | White, Jr. | B60R 13/0212 |
| | | | 280/730.2 |
| 6,220,624 B1 * | 4/2001 | Abraham | B60R 21/207 |
| | | | 280/730.2 |
| 6,302,434 B2 * | 10/2001 | Nakajima | B60R 21/232 |
| | | | 280/730.2 |
| 6,333,515 B1 * | 12/2001 | Kubota | B60R 21/216 |
| | | | 280/730.2 |
| 6,341,796 B1 | 1/2002 | Preisler | |
| 6,439,598 B1 * | 8/2002 | Braun | B60R 21/213 |
| | | | 280/730.2 |
| 6,457,738 B1 | 10/2002 | Labrie et al. | |
| 6,485,048 B2 * | 11/2002 | Tajima | B60R 21/213 |
| | | | 280/730.2 |
| 6,616,182 B2 | 9/2003 | Woolley et al. | |
| 6,793,241 B2 | 9/2004 | Wallner et al. | |
| 7,172,209 B2 * | 2/2007 | Totani | B60R 21/213 |
| | | | 280/730.2 |
| 7,399,030 B2 | 7/2008 | Reitzloff et al. | |
| 7,677,593 B2 * | 3/2010 | Downey | B60R 13/0206 |
| | | | 280/730.2 |
| 9,884,654 B1 | 2/2018 | Stojkovic et al. | |
| 9,975,514 B1 * | 5/2018 | Simon | B60R 21/205 |
| 10,035,408 B2 | 7/2018 | Crismon et al. | |
| 10,538,216 B2 | 1/2020 | White et al. | |
| 10,562,460 B2 * | 2/2020 | Forgette | B60J 7/11 |
| 2002/0175504 A1 | 11/2002 | Tanase et al. | |
| 2004/0256843 A1 * | 12/2004 | Totani | B60R 21/213 |
| | | | 280/730.2 |
| 2005/0052001 A1 | 3/2005 | Totani et al. | |
| 2006/0261580 A1 | 11/2006 | Tiesler et al. | |
| 2015/0224860 A1 | 8/2015 | Bowles et al. | |
| 2022/0250571 A1 * | 8/2022 | Deng | B60R 21/21 |

FOREIGN PATENT DOCUMENTS

| | | |
|---|---|---|
| EP | 0857624 | 1/1998 |
| EP | 1914125 | 10/2007 |
| FR | 2998843 | 6/2014 |
| JP | 2004501018 | 1/2004 |
| KR | 20070121960 | 12/2007 |

* cited by examiner

ONE WAY HINGE BRACKET FOR OPEN FRAME VEHICLE SIDE OCCUPANT RESTRAINT SYSTEM

FIELD OF THE INVENTION

The present invention generally relates to a motor vehicle having an open frame vehicle architecture and, more particularly, to a roof rail having a cover member concealing a side air curtain and a one way hinge bracket adapted to facilitate deployment of the side air curtain.

BACKGROUND OF THE INVENTION

Traditional motor vehicle architecture may include a side air curtain/curtain air bag (SAC/CAB) that interfaces with a soft/flexible headliner and hard trim on the upper pillar trim. The soft/flexible headliner allows for the actuation of the SAC/CAB during an impact event. Certain nontraditional motor vehicles may employ an open frame vehicle architecture that provides the ability for the roof and doors to be removed by the customer. Thus, motor vehicles that employ an open frame vehicle architecture require unique design configurations to provide such additional occupant restraining features for occupants via a curtain restraint, where traditional applications for a SAC/CAB may not be entirely appropriate.

SUMMARY OF THE INVENTION

According to one aspect of the present invention, a unique solution is described that allows a SAC/CAB to be utilized in an open frame vehicle architecture motor vehicle with the use of a one way hinge bracket in combination with hard interior trim components to help improve occupant protection performance. A roof rail assembly for a motor vehicle has an open frame vehicle architecture and comprises a sport tube extending along a longitudinal axis of the motor vehicle and a side air curtain fixedly coupled with the sport tube, the side air curtain having a stowed condition and an inflated condition. The roof rail assembly also has a one way hinge bracket overlaying the side air curtain, the one way hinge bracket further comprising an upper bracket portion coupled to the sport tube via a fastener extending through an orifice in the upper bracket portion, a lower bracket portion depending from a lower edge of the upper bracket portion, and a plurality of aligned openings disposed on the upper bracket portion below the orifice in the upper bracket portion and above the lower edge of the upper bracket portion adapted to allow the lower bracket portion to rotate about a bend line defined by the plurality of aligned openings as the side air curtain deploys from the stowed condition to the inflated condition.

Embodiments of the first aspect of the present disclosure can include any one or a combination of the following features:
 The one way hinge brackets are coupled to the sport tube at predetermined intervals along a longitudinal length of the side air curtain.
 The one way hinge brackets are coupled to the sport tube proximate an A-pillar, a second one of the plurality of one way hinge brackets is coupled to the sport tube proximate a B-pillar, and a third one of the plurality of one way hinge brackets is coupled to the sport tube proximate a C-pillar.
 The upper bracket portion proximate the fastener and the plurality of aligned openings is substantially planar and a mounting section of the sport tube to which the upper bracket portion is coupled is substantially planar.
 The lower bracket portion is disposed about an inboard surface of the air curtain in the stowed condition to overlay the side air curtain.
 The bracket portion further comprises a laterally extending member extending inboard from a lower edge of the upper bracket portion disposed below the plurality of aligned openings and a lower depending member extending downwardly from a distal end of the laterally extending member along the inboard surface of the air curtain in the stowed condition.
 The bend line defined by the plurality of aligned openings acts as a hinge to allow the lower bracket portion to rotate in an inboard direction when the side air curtain deploys from the stowed condition to the inflated condition.
 The deployment of the side air curtain from the stowed condition to the inflated condition displaces the lower bracket portion in the inboard direction and allows inflation of the side air curtain from the stowed condition to the inflated condition.
 The roof rail trim cover is operatively coupled with the sport tube via a second fastener disposed proximate an upper edge of the roof rail trim cover, the roof rail trim cover comprising a cover member having a plurality of parallel hinges integrally molded into and extending along a longitudinal length of the cover member, wherein the one way hinge bracket is disposed between the side air curtain and the cover member of the roof rail trim cover, and wherein the cover member conceals the side air curtain in the stowed condition within a space behind the cover member and further comprises a releasable opening disposed parallel to the plurality of parallel hinges extending along the longitudinal length of the cover member, whereby activation of the side air curtain from the stowed condition to the inflated condition rotates the lower bracket portion of the one way hinge bracket and the cover member about the plurality of parallel hinges to open the releasable opening to allow passage of the side air curtain during activation of the side air curtain from the stowed condition to the inflated condition.
 The releasable opening of the cover member comprises a lower distal edge having a fastenerless clip along a longitudinal length disposed below the cover member and operatively coupled with the roof rail assembly, and wherein the lower distal edge interacts with the fastenerless clip to releasably attach the lower distal edge of the cover member to the roof rail assembly to conceal the side air curtain in the stowed condition within the space behind the cover member, and activation of the side air curtain from the stowed condition to the inflated condition disengages the lower distal edge of the cover member from the fastenerless clip and rotates the lower bracket portion of the one way hinge bracket and the cover member about the plurality of parallel hinges to create an opening extending along the releasable opening to allow passage of the side air curtain during activation of the side air curtain from the stowed condition to the inflated condition.
 The roof rail assembly further comprises a padding disposed on the one way hinge bracket and extending along a longitudinal axis of the motor vehicle.
 The plurality of aligned openings disposed on the upper bracket portion of the one way hinge bracket are formed as a series of aligned slots.

The plurality of aligned openings disposed on the upper bracket portion of the one way hinge bracket are formed as a series of aligned circular holes.

The side air curtain is coupled to the metal sport tube via a first fastener oriented at an angle relative a horizontal transverse plane of the sport tube.

According to another aspect of the present invention, a roof rail assembly for a motor vehicle has a sport tube extending along a longitudinal axis of the motor vehicle and a side air curtain fixedly coupled with the sport tube, the side air curtain having a stowed condition and an inflated condition, wherein the side air curtain is coupled to the metal sport tube via a first fastener. A roof rail trim cover is operatively coupled with the sport tube via a second fastener, the roof rail trim cover further comprising a cover member depending from an upper edge of the roof rail trim cover, the cover member having a plurality of parallel hinges integrally molded into and extending along a longitudinal length of the cover member, wherein the cover member is adapted to conceal the side air curtain in the stowed condition within a space behind the cover member. A one way hinge bracket comprises an upper bracket portion coupled to the sport tube and is disposed within the space between the side air curtain and the roof rail trim cover, a lower bracket portion depending from the upper bracket portion, and a plurality of aligned openings disposed on the upper bracket portion and adapted to allow the lower bracket portion to rotate about a bend line defined by the plurality of aligned openings as the side air curtain deploys from the stowed condition to the inflated condition. A releasable opening is disposed parallel to the plurality of parallel hinges integrally molded into and extending along the longitudinal length of the cover member and a plurality of material reduction grooves on an inner surface of the cover member. Activation of the side air curtain from the stowed condition to the inflated condition rotates the lower bracket portion of the one way hinge bracket about the plurality of aligned openings and the cover member about the plurality of parallel hinges to open the releasable opening to allow passage of side air curtain during activation of the side air curtain from the stowed condition to the inflated condition.

Embodiments of the second aspect of the present disclosure can include any one or a combination of the following features:

The releasable opening of the cover member comprises a lower distal edge and a fastenerless clip having a longitudinal length disposed below the cover member and operatively coupled with the roof rail assembly, wherein the lower distal edge interacts with the fastenerless clip to releasably attach the lower distal edge of the cover member to the roof rail assembly to conceal the side air curtain in the stowed condition within the space behind the cover member, and activation of the side air curtain from the stowed condition to the inflated condition disengages the lower distal edge of the cover member from the fastenerless clip and rotates the lower bracket portion of the one way hinge bracket about the plurality of aligned openings and the cover member about the plurality of parallel hinges to create an opening extending along the releasable opening to allow passage of the side air curtain during activation of the side air curtain from the stowed condition to the inflated condition.

According to yet another aspect of the present invention, a roof rail assembly for a motor vehicle having an open frame vehicle architecture comprises a sport tube extending along a longitudinal axis of the motor vehicle; a side air curtain fixedly coupled with the sport tube, the side air curtain having a stowed condition and an inflated condition; and a plurality of one way hinge brackets overlaying the side air curtain and disposed about an inboard surface of the air curtain in the stowed condition, each of the plurality of one way hinge brackets further comprising an upper bracket portion coupled to the sport tube, a lower bracket portion depending from a lower edge of the upper bracket portion, and a plurality of aligned openings disposed on the upper bracket portion vertically below a fastener and above the lower edge of the upper bracket portion adapted to allow the lower bracket portion to rotate about a bend line defined by the plurality of aligned openings as the side air curtain deploys from the stowed condition to the inflated condition.

Embodiments of the third aspect of the present disclosure can include any one or a combination of the following features:

The plurality of mounting sections on the sport tube to which the plurality of one way hinge brackets are fixedly coupled is substantially planar and wherein a section of each of the plurality of the upper bracket portions proximate the fastener and the plurality of aligned openings is substantially planar; such that when each of the plurality of one way hinge brackets is impacted in an outboard direction, a surface to surface contact between the upper bracket portion of the plurality of one way hinge brackets and the plurality of mounting sections on the sport tube to which each of the plurality of one way hinge brackets is fixedly coupled prevents each of the plurality of one way hinge brackets from bending at the bend line.

The lower bracket portion of each of the plurality of one way hinge brackets comprises a curvilinear radius at a forward and rearward lower corner edge.

The lower bracket portion of at least one of the plurality of one way hinge brackets comprises a curvilinear cutout edge at a forward or rearward edge of the lower bracket.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
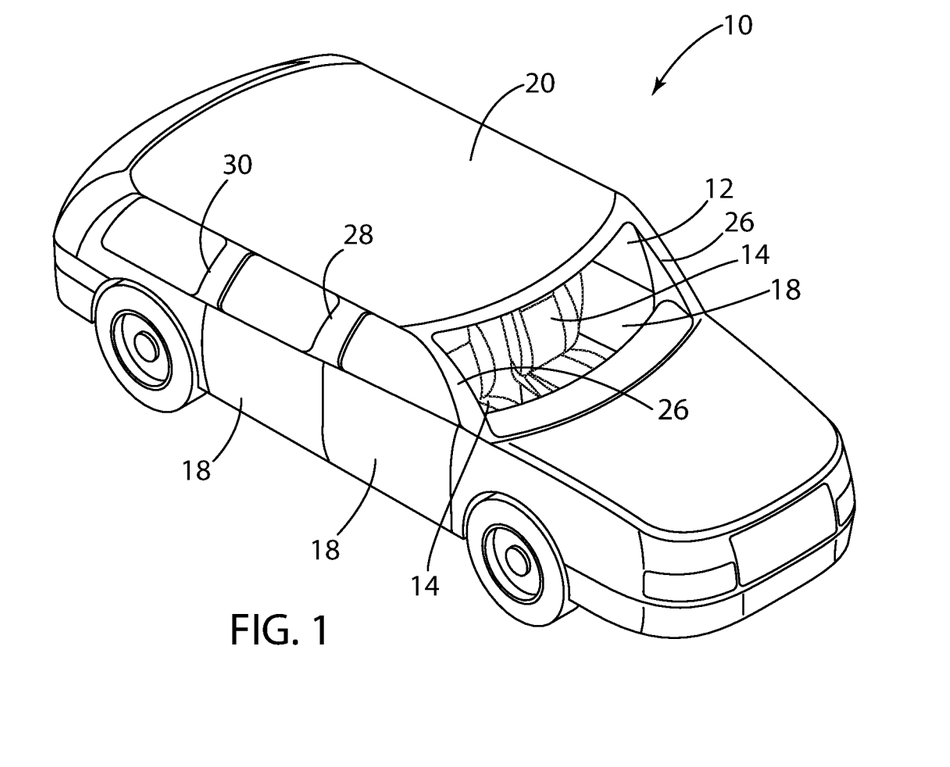
FIG. 1 is a perspective view of a motor vehicle having an open frame vehicle architecture equipped with a plurality of removable side door assemblies and a removable roof assembly in accordance with the present disclosure.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, reference numeral 10 generally designates a motor vehicle. Although illustrated as a six door, sport utility type vehicle, the motor vehicle 10 may be another other type of motor vehicle, such as a two or four door motor vehicle or a van, sedan, or truck. The motor vehicle 10, as is typical, includes an occupant compartment 12 within which a plurality of seating assemblies 14 are mounted. The occupant compartment 12 is nominally defined by a floor pan 16, and, as applicable to the present disclosure, a plurality of removable side door assemblies 18 and a removable roof assembly 20.

Figure 2:
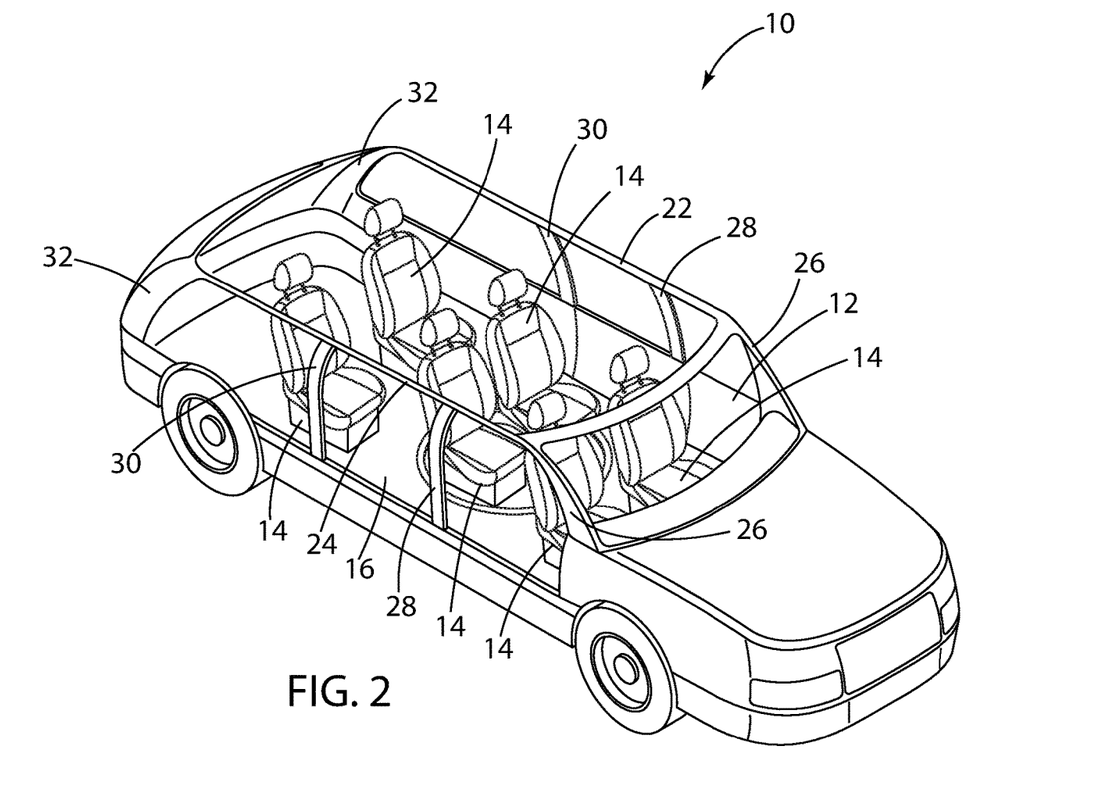
FIG. 2 is a perspective view of the motor vehicle having an open frame vehicle architecture in FIG. 1 with the plurality of removable side door assemblies and the removable roof assembly removed in accordance with the present disclosure.

As shown in FIG. 2, with the plurality of removable side door assemblies 18 and the removable roof assembly 20 removed, the open frame vehicle architecture of the motor vehicle 10 is apparent. A driver side roof rail assembly 22 and a passenger side roof rail assembly 24 extend horizontally and parallel to the longitudinal axis of the motor vehicle 10 and may be supported by an A-pillar 26, B-pillar 28, C-pillar 30, and D-pillar 32, as shown and as is known. Optionally, cross members (not shown) between the driver side roof rail assembly 22 and the passenger side roof rail assembly 24 may be provided. The driver side roof rail assembly 22 and the passenger side roof rail assembly 24 are identical mirror images of each other. As discussed below, the passenger side roof rail assembly 24 will be more fully described.

As best shown in FIGS. 4-7, roof rail assembly 24 includes a sport tube 34 extending along the longitudinal axis of the motor vehicle 10, upon which a side air curtain assembly 36 may be fixedly coupled, and a roof rail trim cover 38. The sport tube 34 is essentially the structural support for the roof rail assembly 24 and may be fabricated from a metal material, such as boron steel or aluminum. The sport tube 34 may be fixedly attached to the A-pillar 26, B-pillar 28, C-pillar 30, and D-pillar 32 via welding techniques and/or via fasteners, as is known, to create a substantially rigid structure partially defining the occupant compartment 12.

The roof rail trim cover 38 may be fabricated from a relatively hard polymer, such as polypropylene, to allow a side air curtain 40 of the side air curtain assembly 36 to deploy in different environmental conditions and temperatures at the lowest economic impact. The roof rail assembly 24 may also include padding 42 disposed on the roof rail trim cover 38 and extending along the longitudinal axis of the motor vehicle 10, wherein the padding 42 may include an energy absorbing material. Alternatively, an elastomeric foam, as shown in FIGS. 6 and 7, may be used as the padding 42.

The side air curtain assembly 36 includes the side air curtain 40. The side air curtain 40 has a stowed condition, shown in FIG. 6, and an inflated condition, shown in FIG. 7. The side air curtain 40 may be coupled to the metal sport tube 34 via a plurality of first fasteners 60 disposed within a plurality of first fastener holes 62 extending longitudinally along the roof rail assembly 24 and extending through a side air curtain assembly bracket 46. The first fasteners 60 may have a centerline along a plane a oriented at a first angle α relative a horizontal transverse plane x of the sport tube 34, as shown in FIG. 6. FIG. 6 is taken as a cross-sectional view proximate the B-pillar 28 along the line VI-VI in FIG. 3. The first angle α of the plurality of first fasteners 60 is adapted to inhibit rotation of the side air curtain 40 about the center-line of the plurality of first fasteners 60 to facilitate the side air curtain 40 exiting through a releasable opening 64, as further described below.

Figures 6, 7:
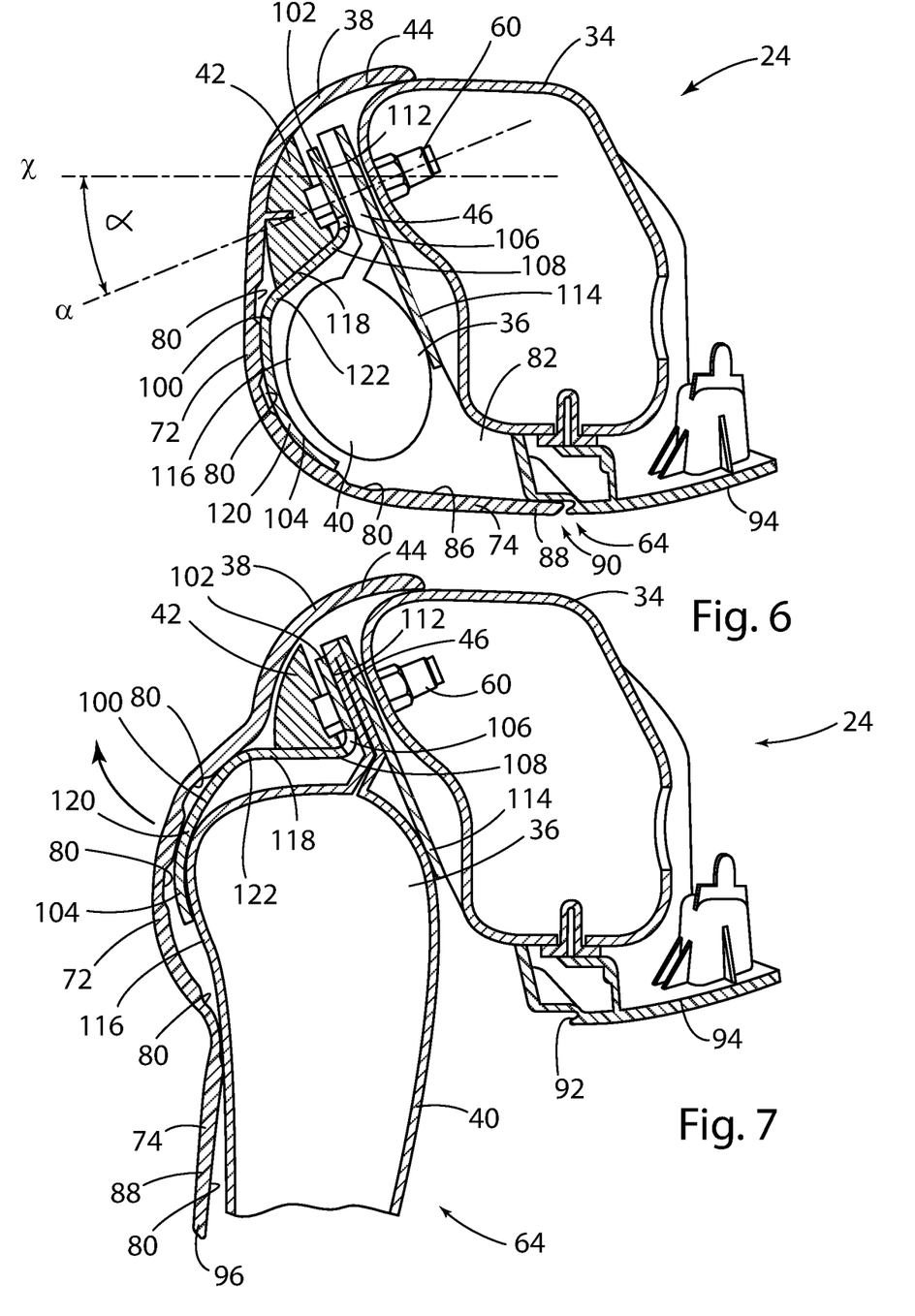
FIG. 6 is a cross-sectional view of the roof rail assembly taken along the line IV-IV in FIG. 3 with the side air curtain in the stowed condition in accordance with the present disclosure.
FIG. 7 is a cross-sectional view of the roof rail assembly taken along the line IV-IV in FIG. 3 with the side air curtain in the inflated condition in accordance with the present disclosure.

As shown in FIG. 6, the angle α of the plurality of first fasteners 60 is adapted to facilitate the direction of the side air curtain 40 during activation of the side air curtain 40 from the stowed condition to the inflated condition. The first angle α of the plurality of first fasteners 60 mounting the side air curtain 40 may be inclined between 18 and 20 degrees relative the horizontal transverse plane x of the sport tube 34. As perhaps best shown in FIGS. 3 and 4, the roof rail trim cover 38 may be operatively coupled with the sport tube 34 via a plurality of second fasteners 66 disposed proximate the upper edge 44 of the roof rail trim cover 38 and extending longitudinally along the roof rail assembly 24. The plurality of second fasteners 66 may be mounted through a plurality of recesses 70 arranged along the roof rail trim cover 38 in order to partially conceal and thereby minimize their visual appearance. The plurality of first fasteners 60 and the plurality of second fasteners 66 may be threaded fasteners, such a bolts. However, screws, rivets, or other fasteners may be employed.

Figure 3:
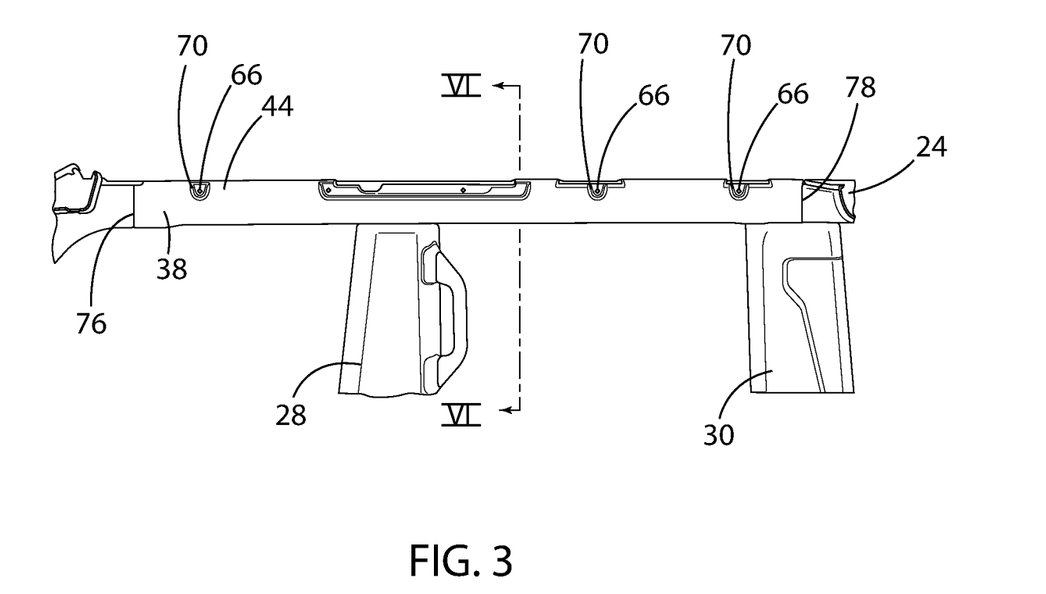
FIG. 3 is a side view of a roof rail assembly with the roof rail trim cover installed in accordance with the present disclosure.

The roof rail trim cover 38 may also include a cover member 74 depending from the upper edge 44 of the roof rail trim cover 38. The cover member 74 may have a longitudinal length disposed along the roof rail trim cover 38 and a plurality of parallel hinges 80 integrally molded into and extending along the longitudinal length of the cover member 74 between the forward edge 76 and the rearward edge 78, as shown in FIG. 3. As shown in FIGS. 6 and 7, the cover member 74 conceals the side air curtain assembly 36 in the stowed condition within a space 82 behind the cover member 74. The cover member 74 may also includes the elongated releasable opening 64 disposed parallel to the plurality of parallel hinges 80 extending along the longitudinal length of the cover member 74. As shown in FIGS. 6-7, the forces within the space 82 developed by activation of the side air curtain 40 from the stowed condition to the inflated condition pushes against an inner surface 86 of the cover member 74 and thereby rotates the cover member 74 about the plurality of parallel hinges 80 to open the releasable opening 64 to allow passage of side air curtain 40 out of the roof rail assembly 24 during activation of the side air curtain 40 from the stowed condition to the inflated condition.

The plurality of parallel hinges 80 may comprise a plurality of parallel material reduction grooves integrally molding into an inner surface 86 of the cover member 74 extending along the longitudinal length of the cover member between the forward edge 76 and the rearward edge 78. Alternatively, the plurality of parallel hinges 80 may comprise a plurality of parallel material reduction grooves formed into an inner surface 86 of the cover member subsequent molding of the cover member.

As shown in FIGS. 6 and 7, the releasable opening 64 of the cover member comprises a lower distal edge 88 having a longitudinal length that is received within a fastenerless clip 90 having a longitudinal length disposed below the cover member 74 and operatively coupled with the roof rail assembly 24. The fastenerless clip 90 may be incorporated as a groove 92 into a separate hard-interior trim base 94 fixedly coupled with the roof rail assembly 24 and may be integrally molded therewith. The roof rail trim cover 38 and the hard-interior trim base 94 of the roof rail assembly 24 may be formed of a weatherproof material, again such as polypropylene.

Figure 4:
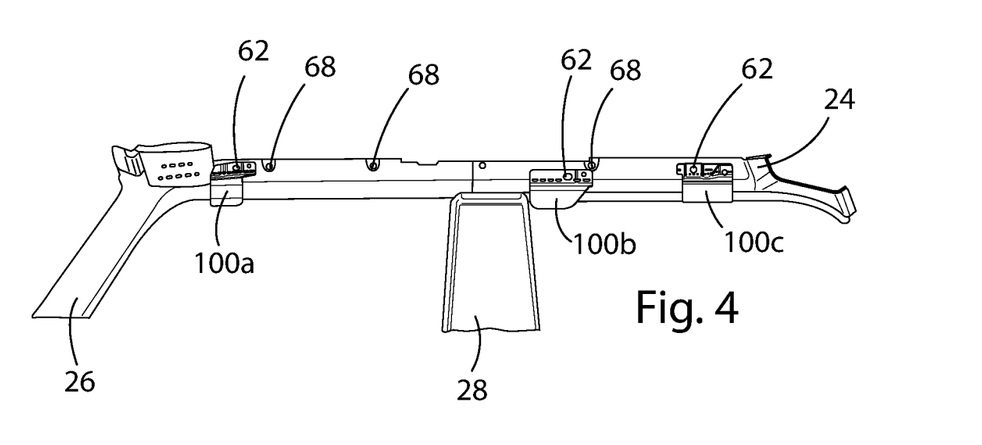
FIG. 4 is a side view of a roof rail assembly with the roof rail trim cover removed in accordance with the present disclosure.

The lower distal edge 88 of the cover member 74 is received within and interacts with the fastenerless clip 90 to releasably attach the lower distal edge 88 of the cover member 74 to the roof rail assembly 24 to conceal the side air curtain assembly 36 in the stowed condition within the space 82 behind the cover member 74, as shown in FIGS. 3 and 4. Activation of the side air curtain 40 from the stowed condition to the inflated condition generates a force sufficient to disengage the lower distal edge 88 of the cover member 74 from the fastenerless clip 90 and rotate the cover member 74 about the plurality of parallel hinges 80 to create an opening to allow passage of the side air curtain 40 during activation of the side air curtain from the stowed condition to the inflated condition, as shown in FIG. 7. The lower distal edge 88 of the cover member 74 interacting with the fastenerless clip 90 may include a chamfered surface 96 that is received within the groove 92 disposed on the fastenerless clip 90 to releasably attach the lower distal edge 88 to the roof rail assembly 24 to conceal the side air curtain assembly 36 in the stowed condition within the space 82 behind the cover member 74. The use of a chamfered surface 96 aids in the release of the lower distal edge 88 from the fastenerless clip 90 upon a predetermined force and improve visual appearance.

A particularly advantageous feature of the present disclosure is a one way hinge bracket 100 that simultaneously allows energy to be absorbed from a head impact in the outboard direction, yet provides inboard and upward movement to allow side air curtain 40 deployment. As shown in FIGS. 6, 7, 9, and 10, the one way hinge bracket 100 overlays the side air curtain 40. There may be three embodiments of the one way hinge bracket 100, designated as one way hinge brackets 100a, 100b, 100c, each disposed along the passenger roof rail assembly 24, as shown in FIG. 4. That is, a plurality of one way hinge brackets 100 may be coupled to the sport tube 34 at predetermined intervals along the longitudinal length of the side air curtain assembly 36, as shown in FIG. 4.

Figure 10:
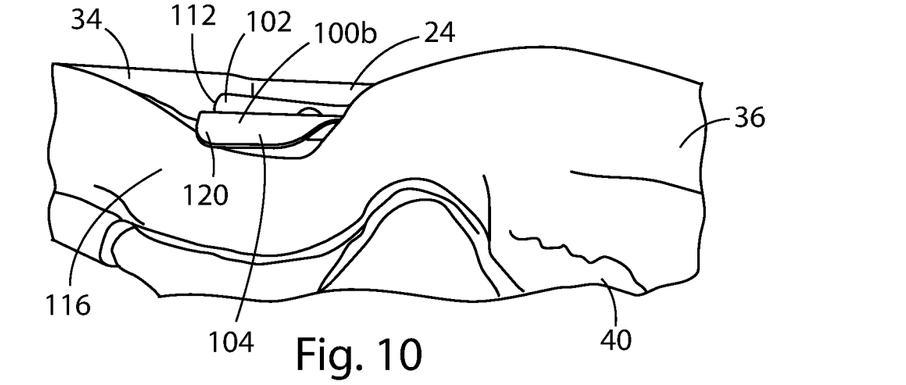
FIG. 10 is yet another perspective side view of the second embodiment of the one way hinge bracket as installed on the sport tube and rotated in an inboard direction by the air curtain in the inflated condition in accordance with the present disclosure.
Figure 11:
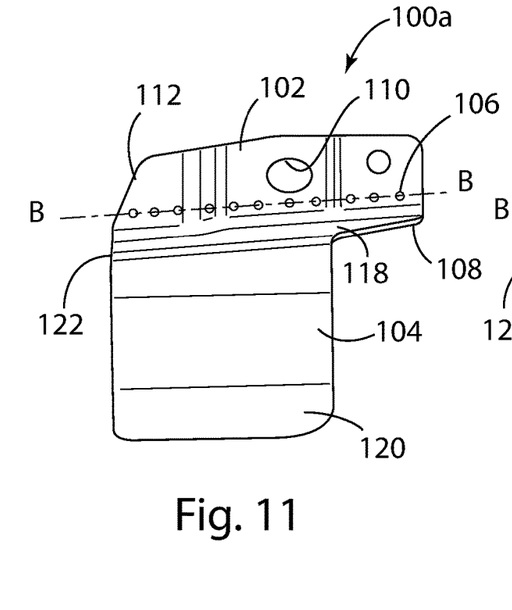
FIG. 11 is a plane view of a first embodiment of the one way hinge bracket in accordance with the present disclosure.
Figure 12:
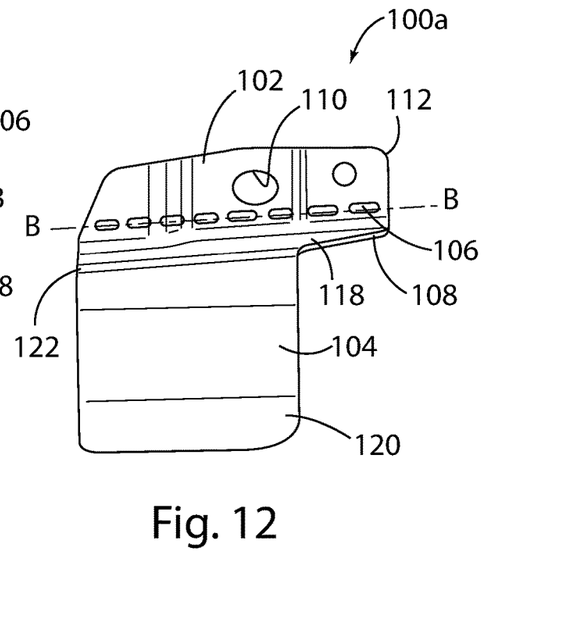
FIG. 12 is another plane view of the first embodiment of the one way hinge bracket in accordance with the present disclosure.

The first embodiment 100a of the one way hinge bracket 100 may be fixedly attached to the passenger roof rail assembly 24 proximate the A-pillar 26, and may have the configuration shown in FIG. 11 or 12. The second embodiment 100b of the one way hinge bracket 100 may be fixedly attached to the passenger roof rail assembly 24 proximate the B-pillar 28, and may have the configuration shown in FIGS. 5, 8, 9, and 10. The third embodiment 100c of the one way hinge bracket 100 may be fixedly attached to the passenger roof rail assembly 24 proximate the C-pillar 30, and may have the configuration shown in FIG. 13. The primary differences in the embodiments are largely driven by packaging and component geometries.

In all of the embodiments of the one way hinge bracket 100, the one way hinge bracket 100 includes an upper bracket portion 102 coupled to the sport tube 34, a lower bracket portion 104 depending from the upper bracket portion 102, and a plurality of aligned openings 106 disposed on the upper bracket portion 102 and above a lower edge 108 of the upper bracket portion 102 adapted to allow the lower bracket portion 104 to rotate about a bend line B-B defined by the plurality of aligned openings 106 as the side air curtain 40 deploys from the stowed condition to the inflated condition. In effect, a one-way hinge line is created in the one way hinge bracket 100 through strategically placed perforations along the longitudinal length of the one way hinge bracket 100.

The one way hinge bracket 100 may be fabricated of high strength low alloy steel (such as grade 1010 steel) and have a nominal thickness of 1.5 mm. The one way hinge bracket 100 may have an overall length of about 95 mm and a vertical elevation of about 75 mm. The one way hinge bracket 100 may also be fabricated from fiberglass-filled nylon or other polymeric materials, which may influence the dimensions.

The one way hinge bracket 100 may be coupled to the sport tube 34 via the first fastener 60 extending through an orifice 110 in the upper bracket portion 102 and the side air curtain assembly bracket 46, as shown in FIGS. 6 and 7. Thus, the fastener 60 extending through the orifice 110 in the upper bracket portion 102 may also be disposed within a plurality of first fastener holes 62 by which the side air curtain assembly 36 is attached to the sport tube 34, as shown in FIG. 6. The orifice 110 may have a horizontal length of about 12.5 mm and a vertical elevation of about 9.2 mm.

Figure 8:
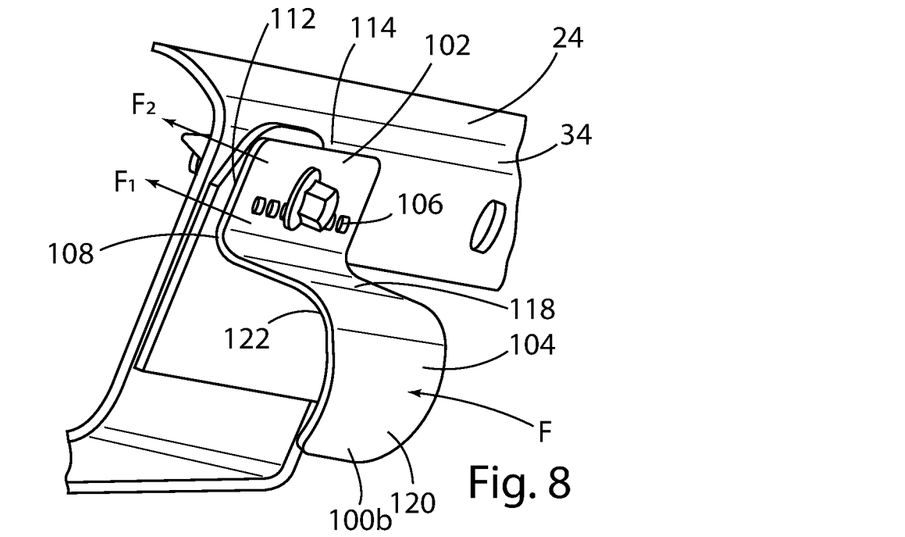
FIG. 8 is a perspective side view of the second embodiment of the one way hinge bracket as installed on the sport tube in accordance with the present disclosure.
Figure 9:
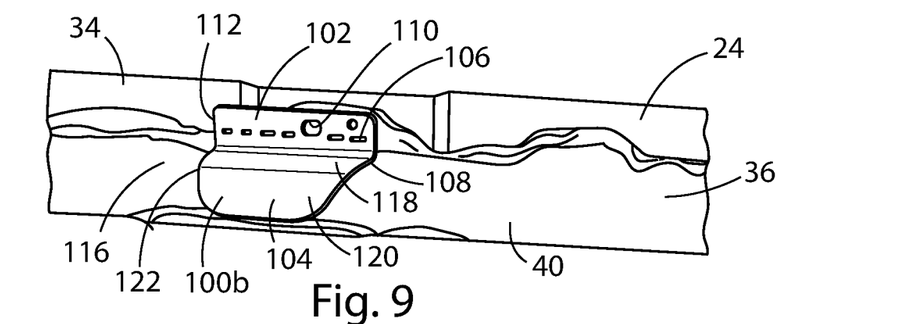
FIG. 9 is another perspective side view of the second embodiment of the one way hinge bracket as installed on the sport tube and overlaying the air curtain in the stowed condition in accordance with the present disclosure.
Figure 13:
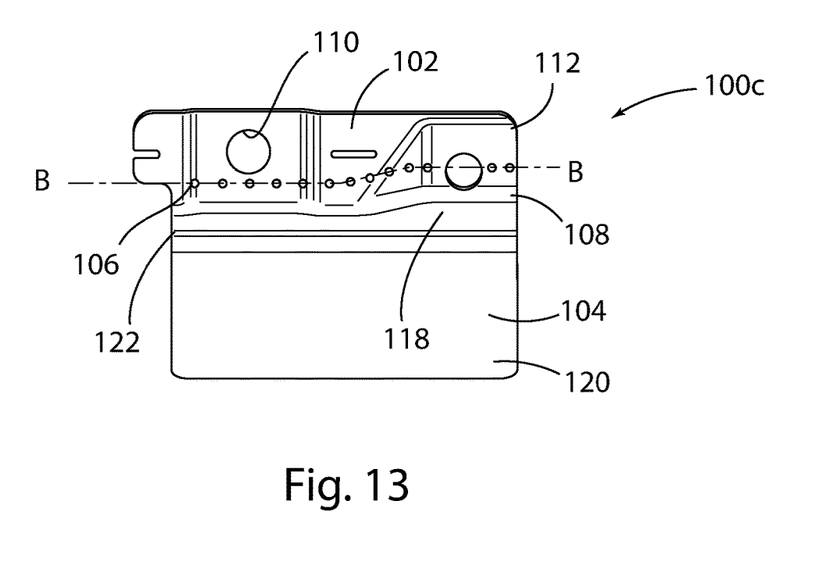
FIG. 13 is a plane view of a third embodiment of the one way hinge bracket in accordance with the present disclosure.

The plurality of aligned openings 106 may be vertically offset from the fastener 60. That is, as shown in FIG. 8, the plurality of aligned openings 106 may be disposed along the horizontal bend line B-B, such that the horizontal centerline of the plurality of aligned openings 106 are disposed vertically below the centerline of the orifice 110 by a distance of about 17 mm and above lower edge 108 of the upper bracket portion 102 by a distance of about 3 mm. The plurality of aligned openings 106 disposed on the upper bracket portion 102 of the one way hinge bracket 100 may be formed as a series of aligned slots having a nominal length of between about 8 to 10 mm and a vertical elevation of about 3 mm, as for example shown in FIGS. 5, 9, and 12. Alternatively, the plurality of aligned openings 106 disposed on the upper bracket portion 102 of the one way hinge bracket 100 may be formed as a series of aligned circular holes having a nominal diameter of about 3.2 mm, as shown in FIGS. 11 and 13.

A mounting section 112 of the upper bracket portion 102 of the one way hinge bracket 100 proximate the first fastener 60 and the plurality of aligned openings 106 is substantially planar. Similarly, a mounting section 114 of the sport tube 34 to which the upper bracket portion 102 of the one way hinge bracket 100 is coupled is substantially planar. The mounting section 114 of the sport tube 34 to which the upper bracket portion 102 of the one way hinge bracket 100 is coupled may be integral with the sport tube 34 or, as shown in FIGS. 6 and 7, a separate plate 114 may be fixedly coupled with the sport tube 34.

The lower bracket portion 104 is disposed about an inboard surface 116 of the side air curtain 40 in the stowed condition. To obtain this configuration, the lower bracket portion 104 may include a laterally extending member 118 extending inboard from the lower edge 108 of the upper bracket portion 102 disposed below the plurality of aligned openings 106 and a lower depending member 120 extending downwardly from a distal end 122 of the laterally extending member 118 along the inboard surface 116 of the side air curtain 40 in the stowed condition.

When the one way hinge bracket 100 is impacted in an outboard direction, a surface-to-surface contact between the mounting section 112 of the upper bracket portion 102 of the one way hinge bracket 100 and the mounting section 114 on the sport tube 34 to which the one way hinge bracket 100 is fixedly coupled prevents the one way hinge bracket 100 from bending at the bend line B-B. That is, as shown in FIG. 8, as a force F is applied to the lower bracket portion 104 of the one way hinge bracket 100, the resulting forces F1 and F2 experienced by the one way hinge bracket 100 are located both above and below the plurality of aligned openings 106. The one way hinge bracket 100 thus remains stationary.

However, when the side air curtain 40 is deployed, it exerts an inboard force on the lower bracket portion 104 of the one way hinge bracket 100. Since the plurality of aligned openings 106 are disposed on the upper bracket portion 102 vertically below the orifice 110 and first fastener 60 above the lower edge 108 of the upper bracket portion 102, the lower bracket portion 104 of the one way hinge bracket 100 is adapted to rotate about the bend line B-B defined by the plurality of aligned openings 106 as the side air curtain 40 deploys from the stowed condition to the inflated condition, as shown in FIGS. 7 and 10.

The bend line B-B as defined by the plurality of aligned openings 106 thus acts as a hinge to allow the lower bracket portion 104 of the one way hinge bracket 100 to rotate in an inboard direction when the side air curtain 40 deploys from the stowed condition to the inflated condition. That is, deployment of the side air curtain 40 from the stowed condition to the inflated condition displaces the lower bracket portion 104 of the one way hinge bracket 100 in the inboard direction and allows inflation of the side air curtain 40 from the stowed condition to the inflated condition.

As shown in FIG. 6, the one way hinge bracket 100 may be disposed between the side air curtain 40 and the cover member 74 of the roof rail trim cover 38. The padding 42 may be attached to the lower bracket portion 104 by an adhesive, where the overall structure is adapted to act to absorb energy from an impact directed in the outboard direction. At the same time, activation of the side air curtain 40 from the stowed condition to the inflated condition rotates the lower bracket portion 104 of the one way hinge bracket 100 and the cover member 74 about the plurality of parallel hinges 80 to open the releasable opening 64 to allow passage of the side air curtain 40 during activation of the side air curtain 40 from the stowed condition to the inflated condition.

Figure 5:
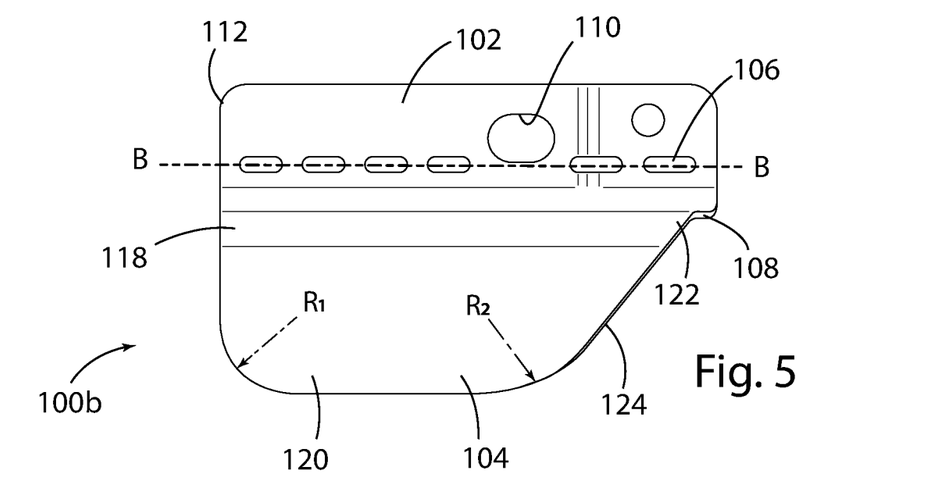
FIG. 5 is a plane view of a second embodiment of the one way hinge bracket in accordance with the present disclosure.

The lower bracket portion 104 of the one way hinge bracket 100 may be provided with a curvilinear radius R1 and R2 at a forward and rearward lower corner edge, respectively. The use of a generous radius to the corners of the lower bracket portion 104 of the one way hinge bracket 100 may be adopted to prevent pressure peak points or damage to the side air curtain 40. For example, as shown in FIG. 5, the radius R1 may be about 12 mm and the radius R2 may be about 25 mm. The lower bracket portion 104 of at least one of the plurality of one way hinge brackets 100*b* also include a curvilinear cutout edge 124 depending rearward (or forward) along the lower bracket portion 104 extending about 52 degrees from a horizontal plane. The use of the cut-out edge 124 may be adopted to promote rotation of the lower bracket portion 104 of the at least one of the plurality of one way hinge brackets 100*b* during the inflation event, such that the relief features allow the side air curtain 40 to deflect the at least one way hinge bracket 100*b* during deployment. Overall manufacturing control and finishing process may be thereby used to minimize damage to the side air curtain 40 during deployment. For example, the cut-out edge 124 may employ a coined edge having a radius of about 0.4 mm on both sides to provide a smooth edge.

The one way hinge bracket 100 disclosed herein provides a top mounted structure that is adapted to absorb head impact energy and provide a one way hinge design to allow the one way hinge bracket 100 to deflect when the side air curtain 40 deploys without damage to the side air curtain 40. This unique design architecture allows side air curtain 40 deployment, yet also provides a hard surface interface by which to manage energy absorption for head impact mitigation in a package constrained environment.

The implementation of a side air curtain assembly 36 on an open frame architecture motor vehicle 10 may be achieved via the use of a set of hard-interior trim components, such as roof rail trim cover 38 and the hard-interior trim base 94 disclosed herein, fabricated from polypropylene. That is, without a static soft headliner, an open frame architecture motor vehicle 10 will require the side air curtain 40 to deploy through a series of hard-interior trim components. The side air curtain 40 is attached positively to the sport tube 34 having a metal body via the plurality of first fasteners 60 having a centerline along a plane that is angled relative the horizontal transverse plane x of the sport tube 34 to help assist the directionality of the side air curtain 40 during activation.

A releasable opening 64 is provided that is disposed parallel to the plurality of parallel hinges 80 integrally molded into and extending along the longitudinal length of the cover member 74 as a plurality of material reduction grooves on an inner surface 86 of the cover member 74, whereby activation of the side air curtain 40 from the stowed condition to the inflated condition rotates the cover member 74 and the lower bracket portion 104 of the one way hinge bracket 100 about the plurality of parallel hinges 80 and the bend line B-B to open the releasable opening 64 to allow passage of side air curtain 40 during activation of the side air curtain 40.

The material thickness of the plurality of parallel hinges 80 contributes to the function of side air curtain 40 during inflation. Implementing the parallel hinges 80 as a series of material reduction grooves on the inner surface 86 of the cover member 74 and full rotation of the cover member 74 and the lower bracket portion 104 of the one way hinge bracket 100 away from the side air curtain 40 during inflation promotes full and rapid inflation of the side air curtain 40 in the desired direction through the releasable opening 64.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A roof rail assembly for a motor vehicle having an open frame vehicle architecture comprising:

a sport tube extending along a longitudinal axis of the motor vehicle;

a side air curtain fixedly coupled with the sport tube, the side air curtain having a stowed condition and an inflated condition;

a one way hinge bracket overlaying the side air curtain, the one way hinge bracket further comprising an upper bracket portion coupled to the sport tube via a first fastener extending through an orifice in the upper bracket portion, a lower bracket portion depending from a lower edge of the upper bracket portion, and a plurality of aligned openings disposed on the upper bracket portion below the orifice in the upper bracket portion and above the lower edge of the upper bracket portion adapted to allow the lower bracket portion to rotate about a bend line defined by the plurality of aligned openings as the side air curtain deploys from the stowed condition to the inflated condition; and a roof rail trim cover operatively coupled with the sport tube via a second fastener disposed proximate an upper edge of the roof rail trim cover, the roof rail trim cover comprising a cover member having a plurality of parallel hinges integrally molded into and extending along a longitudinal length of the cover member;

wherein the one way hinge bracket is disposed between the side air curtain and the cover member of the roof rail trim cover;

wherein the bend line defined by the plurality of aligned openings acts as a hinge to allow the lower bracket portion to rotate in an inboard direction when the side air curtain deploys from the stowed condition to the inflated condition;

wherein deployment of the side air curtain from the stowed condition to the inflated condition displaces the lower bracket portion in the inboard direction and allows inflation of the side air curtain from the stowed condition to the inflated condition; and wherein the cover member conceals the side air curtain in the stowed condition within a space behind the cover member and further comprises a releasable opening disposed parallel to the plurality of parallel hinges extending along the longitudinal length of the cover member, whereby activation of the side air curtain from the stowed condition to the inflated condition rotates the lower bracket portion of the one way hinge bracket and the cover member about the plurality of parallel hinges to open the releasable opening to allow passage of the side air curtain during activation of the side air curtain from the stowed condition to the inflated condition.

2. The roof rail assembly of claim 1, further comprising a plurality of one way hinge brackets coupled to the sport tube at predetermined intervals along a longitudinal length of the side air curtain.

3. The roof rail assembly of claim 2, wherein a first one of the plurality of one way hinge brackets is coupled to the sport tube proximate an A-pillar, a second one of the plurality of one way hinge brackets is coupled to the sport tube proximate a B-pillar, and a third one of the plurality of one way hinge brackets is coupled to the sport tube proximate a C-pillar.

4. The roof rail assembly of claim 1, wherein a section of the upper bracket portion proximate the first fastener and the plurality of aligned openings is substantially planar and a mounting section of the sport tube to which the upper bracket portion is coupled is substantially planar.

5. The roof rail assembly of claim 1, wherein the lower bracket portion is disposed about an inboard surface of the air curtain in the stowed condition to overlay the side air curtain.

6. The roof rail assembly of claim 5, wherein the lower bracket portion further comprises a laterally extending member extending inboard from the lower edge of the upper bracket portion disposed below the plurality of aligned openings and a lower depending member extending downwardly from a distal end of the laterally extending member along the inboard surface of the air curtain in the stowed condition.

7. The roof rail assembly of claim 1, wherein the releasable opening of the cover member comprises a lower distal edge having a fastenerless clip along a longitudinal length disposed below the cover member and operatively coupled with the roof rail assembly; and
  wherein the lower distal edge interacts with the fastenerless clip to releasably attach the lower distal edge of the cover member to the roof rail assembly to conceal the side air curtain in the stowed condition within the space behind the cover member, and activation of the side air curtain from the stowed condition to the inflated condition disengages the lower distal edge of the cover member from the fastenerless clip and rotates the lower bracket portion of the one way hinge bracket and the cover member about the plurality of parallel hinges to create an opening extending along the releasable opening to allow passage of the side air curtain during activation of the side air curtain from the stowed condition to the inflated condition.

8. The roof rail assembly of claim 1, wherein the roof rail assembly further comprises a padding disposed on the one way hinge bracket and extending along a longitudinal axis of the motor vehicle.

9. The roof rail assembly of claim 1, wherein the plurality of aligned openings disposed on the upper bracket portion of the one way hinge bracket are formed as a series of aligned slots.

10. The roof rail assembly of claim 1, wherein the plurality of aligned openings disposed on the upper bracket portion of the one way hinge bracket are formed as a series of aligned circular holes.

11. The roof rail assembly of claim 1, wherein the side air curtain is coupled to the sport tube via the first fastener oriented at an angle relative a horizontal transverse plane of the sport tube.

12. A roof rail assembly for a motor vehicle having an open frame vehicle architecture comprising:
  a sport tube extending along a longitudinal axis of the motor vehicle;
  a side air curtain fixedly coupled with the sport tube, the side air curtain having a stowed condition and an inflated condition, wherein the side air curtain is coupled to the sport tube via a first fastener;
  a roof rail trim cover operatively coupled with the sport tube via a second fastener, the roof rail trim cover further comprising a cover member depending from an upper edge of the roof rail trim cover, the cover member having a plurality of parallel hinges integrally molded into and extending along a longitudinal length of the cover member, wherein the cover member is adapted to conceal the side air curtain in the stowed condition within a space behind the cover member;
  a one way hinge bracket comprising an upper bracket portion coupled to the sport tube and disposed within the space between the side air curtain and the roof rail trim cover, a lower bracket portion depending from the upper bracket portion, and a plurality of aligned openings disposed on the upper bracket portion and adapted to allow the lower bracket portion to rotate about a bend line defined by the plurality of aligned openings as the side air curtain deploys from the stowed condition to the inflated condition; and
  a releasable opening disposed parallel to the plurality of parallel hinges integrally molded into and extending along the longitudinal length of the cover member as a plurality of material reduction grooves on an inner surface of the cover member, whereby activation of the side air curtain from the stowed condition to the inflated condition rotates the lower bracket portion of the one way hinge bracket about the plurality of aligned openings and the cover member about the plurality of parallel hinges to open the releasable opening to allow passage of side air curtain during activation of the side air curtain from the stowed condition to the inflated condition.

13. The roof rail assembly of claim 12, wherein the releasable opening of the cover member comprises a lower distal edge and a fastenerless clip having a longitudinal length disposed below the cover member and operatively coupled with the roof rail assembly;
  wherein the lower distal edge interacts with the fastenerless clip to releasably attach the lower distal edge of the cover member to the roof rail assembly to conceal the side air curtain in the stowed condition within the space behind the cover member, and activation of the side air curtain from the stowed condition to the inflated condition disengages the lower distal edge of the cover member from the fastenerless clip and rotates the lower bracket portion of the one way hinge bracket about the plurality of aligned openings and the cover member about the plurality of parallel hinges to create an opening extending along the releasable opening to allow passage of the side air curtain during activation of the side air curtain from the stowed condition to the inflated condition.

* * * * *